(12) United States Patent
Hickson et al.

(10) Patent No.: US 10,645,911 B2
(45) Date of Patent: *May 12, 2020

(54) AUTOMATED AQUACULTURE PEN LOCATION

(71) Applicant: International Business Machines Corporation, Armonk, NY (US)

(72) Inventors: Roslyn I. Hickson, Carlton (AU); Timothy M. Lynar, Kew (AU); Olivia J. Smith, Carlton (AU); Annalisa Swan, Melbourne (AU); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 15/498,578

(22) Filed: Apr. 27, 2017

(65) Prior Publication Data

US 2018/0310531 A1 Nov. 1, 2018

(51) Int. Cl.
| | |
|---|---|
| *A01K 61/60* | (2017.01) |
| *G06Q 50/02* | (2012.01) |
| *G06Q 10/06* | (2012.01) |
| *A01G 33/00* | (2006.01) |
| *G06N 5/04* | (2006.01) |
| *G06N 3/12* | (2006.01) |
| *G06N 5/00* | (2006.01) |

(52) U.S. Cl.
CPC ............. *A01K 61/60* (2017.01); *A01G 33/00* (2013.01); *G06N 3/126* (2013.01); *G06N 5/003* (2013.01);
(Continued)

(58) Field of Classification Search
CPC ...... A01K 61/60; A01K 63/00; A01K 63/003; A01K 63/02; A01K 61/00; A01K 61/10;
(Continued)

(56) References Cited

U.S. PATENT DOCUMENTS

| | | | | |
|---|---|---|---|---|
| 10,191,489 B1* | 1/2019 | Rapoport | ............. | G05D 1/0088 |
| 2006/0096548 A1* | 5/2006 | Ytterland | ............... | A01K 61/60 |
| | | | | 119/223 |

(Continued)

FOREIGN PATENT DOCUMENTS

TW 201012382 4/2010

OTHER PUBLICATIONS

Jusup et al., Predicting aquaculture-derived benthic organic enrichment: Model validation, Ecological Modelling 220 (19), Oct. 2009, pp. 2407-2414.
(Continued)

*Primary Examiner* — Trinh T Nguyen
(74) *Attorney, Agent, or Firm* — Joseph Petrokaitis; Otterstedt, Wallace & Kammer, LLP (57) ABSTRACT

A method of positioning an aquaculture pen includes retrieving data about the aquaculture pen disposed in a water environment, determining a forecasted location of the aquaculture pen, forecasting at least one factor of interest based on the data about the aquaculture pen for a time period of interest, predicting a factor of interest within a feasible range of movement for the aquaculture pen, determining a potential new location within the feasible range of movement using the data about the aquaculture pen, the feasible range of movement and the factor of interest within the feasible range of movement for the aquaculture pen, and moving the aquaculture pen to the potential new location.

3 Claims, 7 Drawing Sheets

(52) U.S. Cl.
CPC .......... *G06N 5/04* (2013.01); *G06Q 10/06312* (2013.01); *G06Q 50/02* (2013.01)

(58) Field of Classification Search
CPC ...... A01K 63/006; A01K 61/65; A01K 61/50; A01K 61/51; A01K 61/54; A01K 61/59; A01K 61/75; A01K 99/00; A01K 2227/40; A01G 33/00; G06Q 50/02; G05D 1/0088; G05D 1/0206; B63G 8/001; B63G 8/08; B63G 2008/004; Y02A 40/826; Y02A 40/81; Y02A 40/812; Y02A 40/82; Y02A 40/822; Y02A 40/824; Y02A 40/828; Y02A 40/836

See application file for complete search history.

(56) References Cited

U.S. PATENT DOCUMENTS

| | | | |
|---|---|---|---|
| 2006/0102087 A1* | 5/2006 | Page | A01K 61/90 119/223 |
| 2007/0251461 A1 | 11/2007 | Reichard | |
| 2009/0235870 A1* | 9/2009 | Troy | F03G 7/05 119/223 |
| 2010/0050952 A1* | 3/2010 | Stillman | A01K 61/60 119/223 |
| 2010/0287829 A1* | 11/2010 | Bussell | A01G 33/00 47/1.4 |
| 2011/0315085 A1* | 12/2011 | Lindgren | A01K 61/60 119/203 |
| 2012/0006277 A1 | 1/2012 | Troy | |
| 2015/0156998 A1 | 6/2015 | Terry | |
| 2016/0244130 A1* | 8/2016 | Mood | A01K 63/02 |

OTHER PUBLICATIONS

Celikkol et al., Engineering Overview of the University of New Hampshire's Open Ocean Aquaculture Project, Proc. Oceans 06, Boston, MA, Sep. 2006, pp. 1-8.

Roslyn I. Hickson et al., unpublished U.S. Appl. 15/857,705, filed Dec. 29, 2017, Automated Aquaculture Pen Location, pp. 1-23 plus 7 sheets of drawings.

Paul J. Otterstedt, List of IBM Patents or Patent Applications Treated As Related, Jun. 22, 2018, pp. 1-2.

* cited by examiner

AUTOMATED AQUACULTURE PEN LOCATION

BACKGROUND

The present disclosure relates generally to open-pen aquaculture and more particularly to a position system for an aquaculture pen.

In open-pen aquaculture, negative interactions between environmental factors and pen production can occur in both directions. Environmental factors are both impacted by the location and output of the pen, and impact the pen production. For instance, water temperature, salinity, nutrient levels, etc., all affect growth and morbidity rates of produce. Furthermore, output from the pen, such as effluent, impacts the local environment (e.g., nutrient levels) and affects downstream production. Additionally there are impacts between the produce and the native flora and fauna, for example introduction and propagation of diseases.

BRIEF SUMMARY

According to an exemplary embodiment of the present invention, a method of positioning an aquaculture pen includes retrieving data about the aquaculture pen disposed in a water environment, determining a forecasted location of the aquaculture pen, forecasting at least one factor of interest based on the data about the aquaculture pen for a time period of interest, predicting a factor of interest within a feasible range of movement for the aquaculture pen, determining a potential new location within the feasible range of movement using the data about the aquaculture pen, the feasible range of movement and the factor of interest within the feasible range of movement for the aquaculture pen, and moving the aquaculture pen to the potential new location.

According to an exemplary embodiment of the present invention, a system includes an aquaculture pen, a sensor disposed at the aquaculture pen, a computer system in communication with the sensor, wherein the computer system retrieves, from the sensor, data about the aquaculture pen, determines a forecasted location of the aquaculture pen, forecasts at least one factor of interest based on the data about the aquaculture pen for a time period of interest, predicts a factor of interest within a feasible range of movement for the aquaculture pen, and determines a potential new location within the feasible range of movement using the data about the aquaculture pen, the feasible range of movement and the factor of interest within the feasible range of movement for the aquaculture pen, and a propulsion unit in communication with the computer system, receiving a control signal from the computer system for positioning the aquaculture pen at the potential new location.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

Autonomous and semi-autonomous positioning of one or more aquaculture pens, which reduces negative impact of an environment on aquaculture farming, reduces negative impacts of aquaculture farming on an environment; and leverages positive interactions between the environment and aquaculture farming; and Improved forecasting and awareness of crop growth and environmental impacts.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an embodiment of the present invention, meteorological and oceanographic forecasting techniques are used together with predictive population modeling in an analytic and cognitive decision support method for controlling aquaculture pen placement whilst constraining negative environmental and downstream effects. For example, pen placement can be selected to satisfy one or more goals, such minimizing a likelihood of disease introduction into the natural environment or limiting quantities of nutrients or contaminants in the water around one or more pens.

According to an embodiment of the present invention, the movement of one or more aquaculture pens is automated within a finite area, for example, an area licensed for the use of aquaculture pens. According to an embodiment of the present invention, the pens can be moved by one or more propulsion units, including for example, tender craft or tugs under the control of a server, dedicated power units (e.g., motors, engines, etc.), and the like. A computer system determines pen placement based on available data and predictive analytics. Locations are determined by optimizing the pen placement for an objective function of interest.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
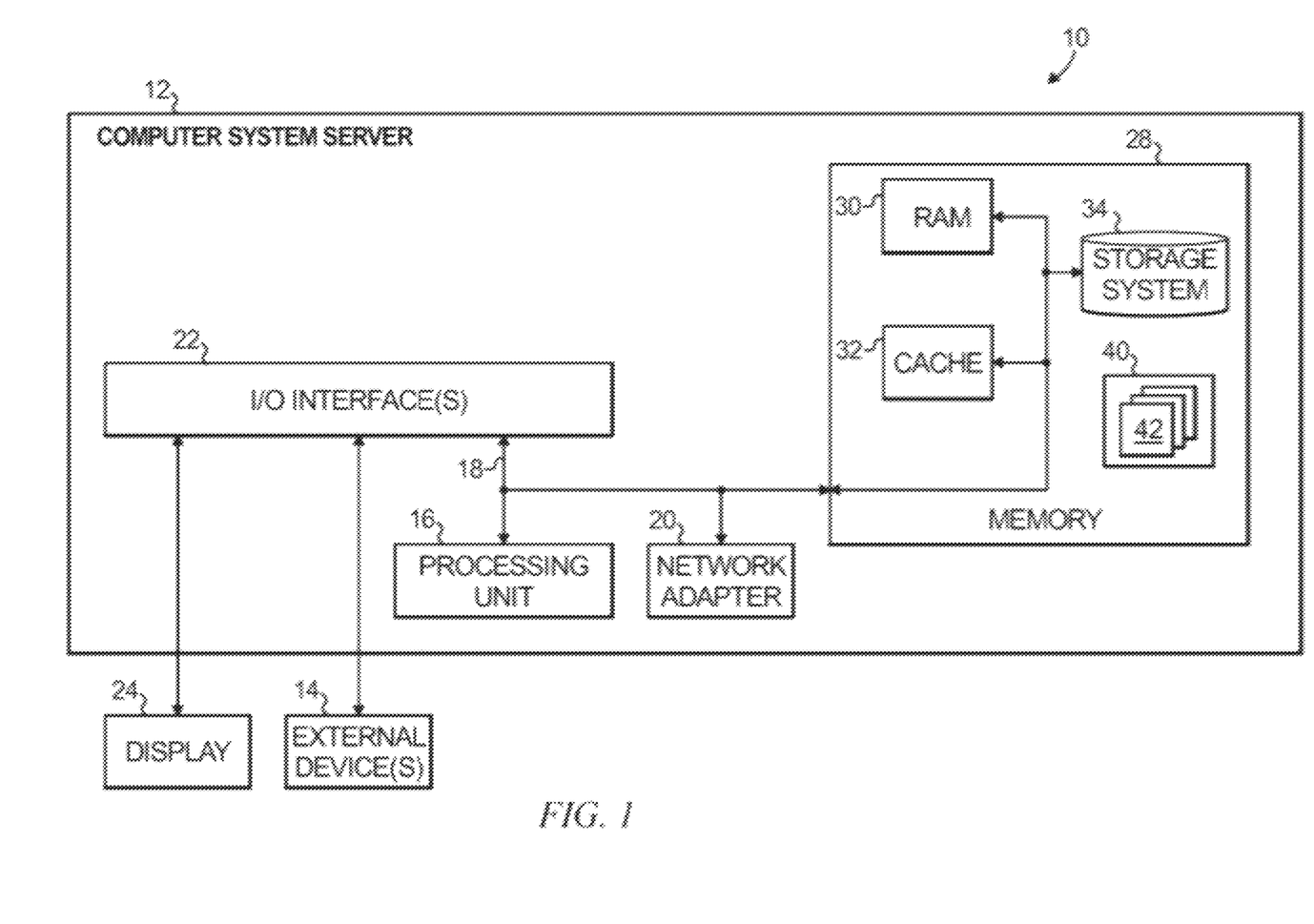
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
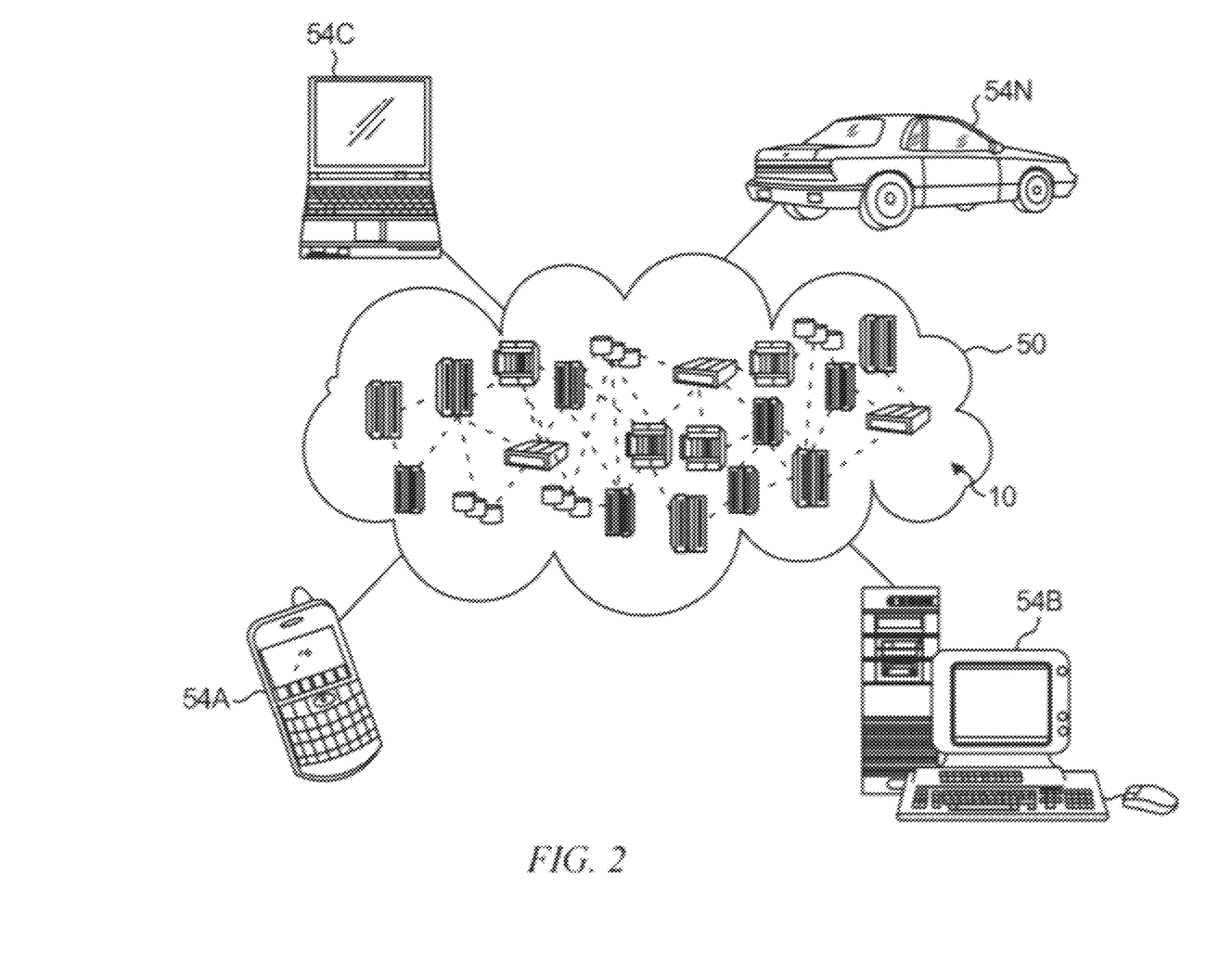
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
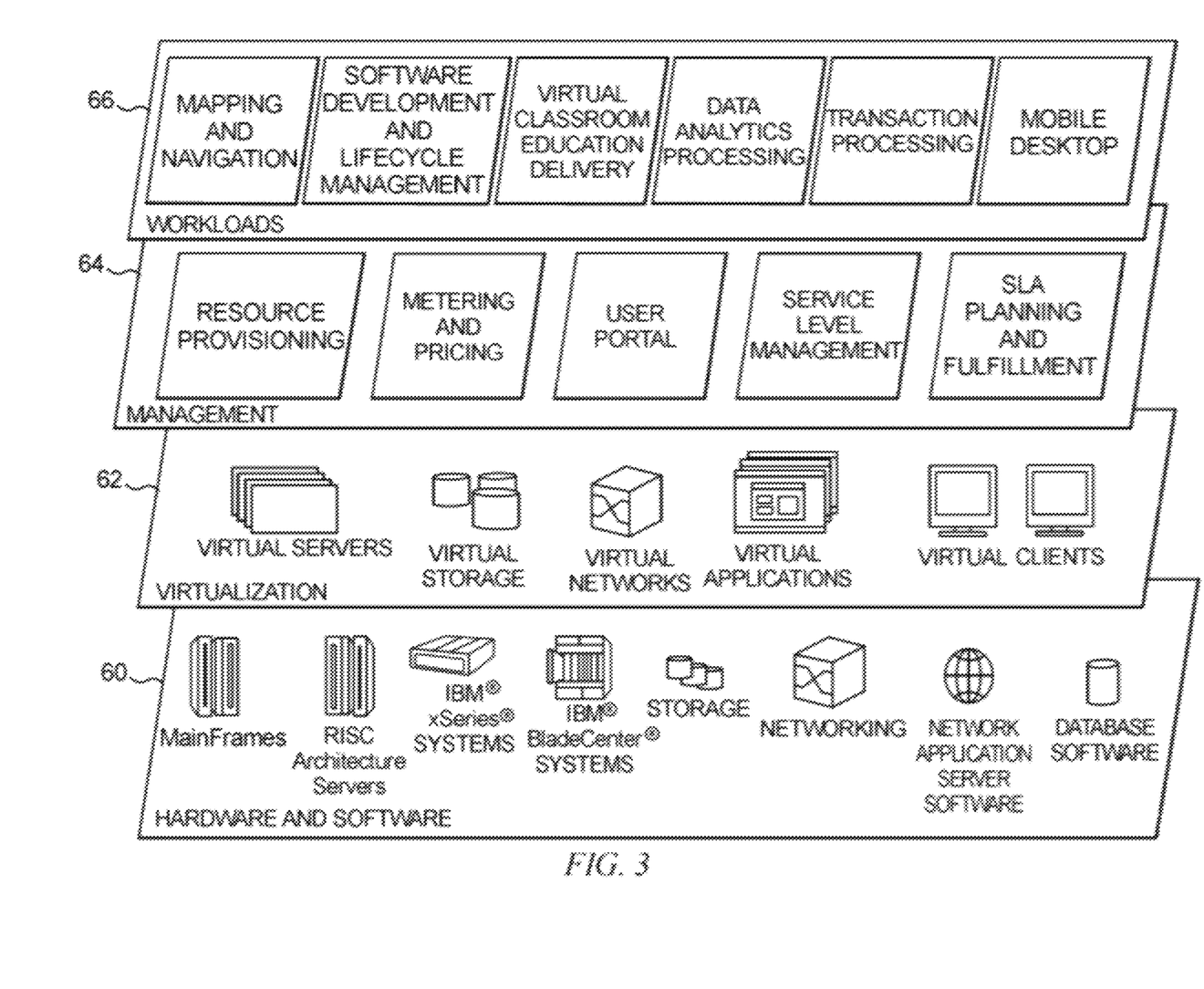
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

According to an embodiment of the present invention, an objective function takes one or more parameters as input, including for example, a preferred water temperature range for a crop (e.g., animals or seaweed) in the pen, salinity, nutrient availability, water quality, the environmental impact of the pen itself, etc. Additional parameters can include for example, an average length of individuals in the crop, an estimated weight of the crop, a measure of die-off in the crop, etc., as determined from one or more images of the crop. According to an embodiment of the present invention, the predictive analytics includes one or more of population modelling, weather modelling, ocean current modelling, local wild population, disease modelling, consideration of external ecological effects, etc.

Embodiments of the present invention can be configured for a single pen or more than one pen, wherein the locations and movements of the pens are coordinated, for example, where the objective function takes into consideration the impact of clusters of pens.

Figure 4:
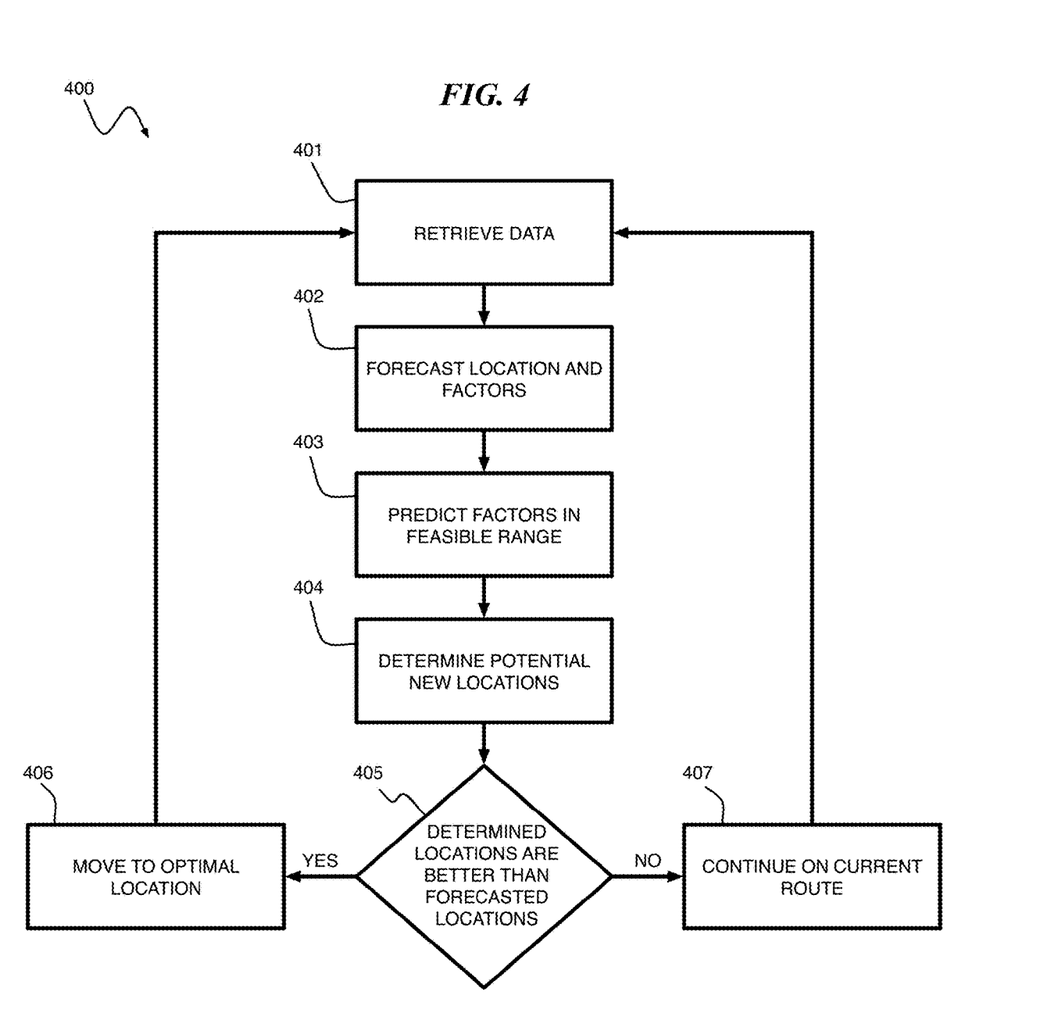
FIG. 4 is a flow diagram of a method for positioning an aquaculture pen according to an embodiment of the present invention.

Referring to FIG. 4, according to an embodiment of the present invention, a method 400 for positioning an aquaculture pen includes retrieving data 401, forecasting the location of the pens (e.g., due to water currents or on a previously determined route) and factors of interest based on the data for one or more time periods of interest 402, predicting factors of interest (including advanced interpolation) within a feasible range of movement for the pen(s) 403, determining potential new location(s) within feasible range(s) based on the data and the feasible range of movement for the pen(s) 404, and at block 405, if a determined potential new location is sufficiently better than a current location, as evaluated by the objective function of interest, the pen(s) are moved/redirected to that/those location(s) 406. Otherwise, continue on current route 407.

According to an embodiment of the present invention, the retrieved data 401 can include information about a licensed area, current location(s), pen velocity(ies) (e.g., due to ocean currents, propulsion units, etc.), pen dimensions, environmental factors (e.g., weather including precipitation, wave action, etc.), crop conditions (e.g., to understand optimal temperature range, nutrient levels, feeding requirements, etc.), water quality (e.g., salinity, nutrients, effluent, etc.), among other data. It should be understood that the data is collected using one or more sensors, which can be co-located with the pen (e.g., water testing equipment, a camera capturing images of the crop) or remote (e.g., satellite imagery or independent ocean based sensors). In at least one exemplary embodiment, samples are collected by technicians and the data is determined in a laboratory.

According to one or more exemplary embodiments of the present invention, forecasting the location of the pens and the factors of interest 402 uses tidal forces and existing movement data (e.g., movement of the surface currents taken from a models such as a Regional Coastal Ocean Model (NCOM), movement of the pen, movement of a group of pens, movement of data collecting drift buoys, etc.) to forecast the location of the pen at a future time (e.g., over the next 48 hours, 72 hours, 168 hours, etc.). The tidal forces refer to, for example, inertial oscillations, average patterns of ocean surface currents, tides, wind induced currents, storm surges, etc. Additional data is contemplated, including the use of, for example, weather prediction models to predict the solar energy available at various points in space and time, which can cause thermally induced variations in the tidal forces. According to at least one embodiment of the present invention, weather prediction is performed using a tool, such as the Weather Research and Forecasting (WRF) Model or the Fifth-Generation Mesoscale Model (MM5) model. In an exemplary case, a forecast might combine the effects of a 2 knot current in a first direction with a 15 knot wind in a second direction to calculate a vector predicting the movement of the pen. Additional data can be used, for example, a confidence in the wind direction can be used to increase or decrease a feasible range of an expected location of the pen at some time in the future.

According to an embodiment of the present invention, the prediction of the factors of interest within the feasible range of movement for the pen(s) 403 uses a model of water flow and dispersion for an area around the pen(s) (e.g., using a Regional Coastal Ocean Model (NCOM)), combined with the recorded data for the factor of interest. In one exemplary embodiment of the present invention, the prediction uses the predicted path of the pen as input, together with recorded data for nutrient levels, to predict levels of one or more nutrients of interest across space (e.g., the predicted path of the pen) and time. According to at least one embodiment of the present invention, the prediction 403 outputs one or more of a maximum nutrient concentration, a volume of water where nutrient concentrations are likely to fall outside a target concentration, a positive and/or negative impact of a nutrient level on a crop in the pen, and a positive and/or negative impact of the pen and/or crop on a local environment.

According to an embodiment of the present invention, the decision made at block 405 can balance a predicted improvement in conditions at a newly determined location against a cost (e.g., energy expenditure) of moving/redirecting the pen.

According to an embodiment of the present invention, an output of the decision making at block 405 (e.g., a proposed solution to an optimization problem) includes a set of fixed locations (i.e., the potential new locations) and movements for the pen(s) across a fixed time period (e.g., 24 hours, 1 week, etc.), possibly including a recourse function to account for end effects. According to an embodiment of the present invention, the recourse function is a function of all possible final locations (i.e., determined locations) that gives an estimate of the value (on each objective function) of being in that state. For each possible final location, the predictive model measures against all components of the objective function, as well as allowing for determination of the expected energy impacts, both the predicted energy cost of moving the pen(s) as well as any predicted energy gains from renewable energy sources as well as the uncertainty in the predictions.

An optimization method such as a genetic algorithm can be used to generate and compare the potential new locations. Comparing the potential new locations in the presence of multiple objectives can be handled by any of a number of methods, including but not limited to requiring a user to specify a relative importance of each objective and creating a single objective function or providing a human user with a set of non-dominated solutions representing the Pareto frontier (the Pareto frontier refers to the set of all potential solutions where no objective could be improved without reducing performance on at least one other objective).

The calculations involved in the optimization, as well as the predictions, can be undertaken either locally on one or more (possibly communicating) pens, remotely, on the cloud, or some combination of these. Once one or more of the potential new locations has been selected and, if required, communicated to the pens, the pens are moved. It should be understood that one or more of the pens may already be moving, e.g., on a current, and the moving includes adjusting a velocity (e.g., speed and/or direction of travel of the pen(s)).

Figure 5:
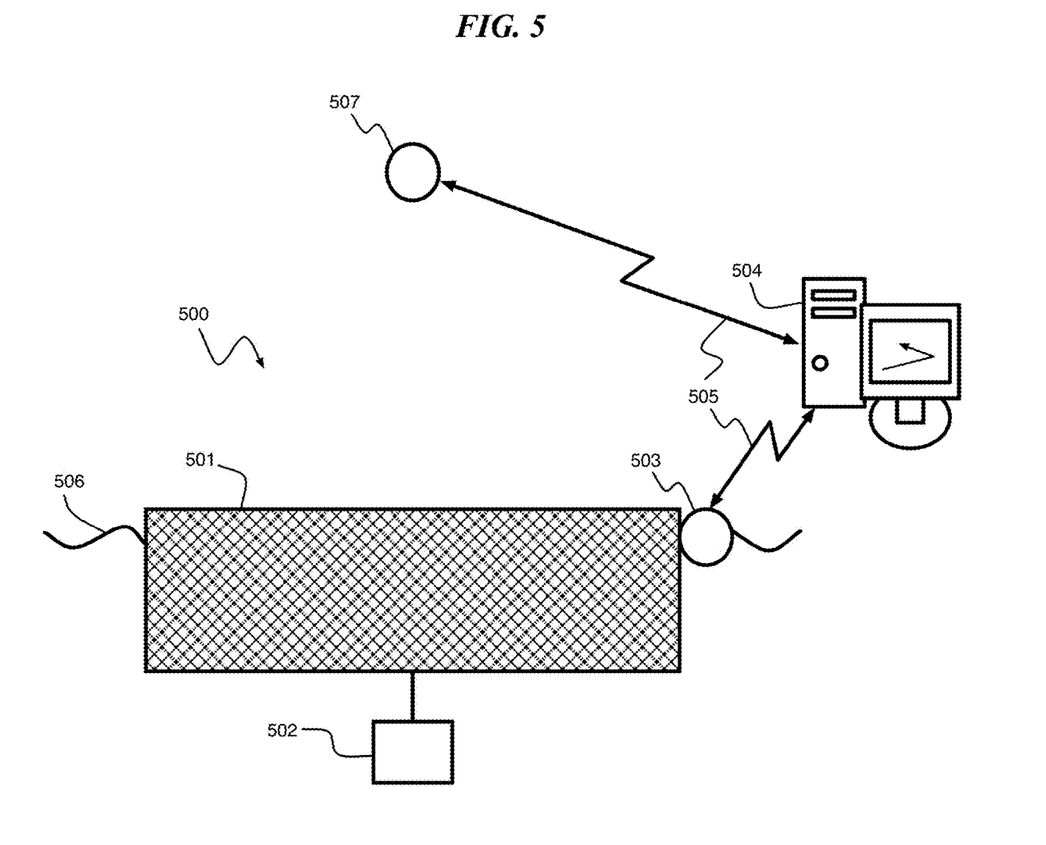
FIG. 5 is shows an aquaculture pen system according to an embodiment of the present invention.

According to an embodiment of the present invention, FIG. 5 depicts a system 500 comprising a pen 501, a propulsion unit 502, and sensors 503. The system 500 further includes a computer system 504 in communication with the propulsion unit 502 and the sensors 503. The computer system 504 can be local or remote from the sensors 503 (and pen 501 and propulsion unit 502). In a remote configuration, the computer system 504 and the sensors 503 communicate with one another via a network 505 (e.g., marine satellite communication network, cellular network, etc.). In at least one embodiment, the computer system 504 receives input from one or more remote sensors 507, such as weather satellites, sensor equipped buoys, other pens, etc., via the network 505.

According to an embodiment of the present invention, analytics are conducted by the computer system 504 with requisite peripherals (e.g., keyboard, mouse, network connection, etc.). The computer system 504 performing the analytics forecasts a location for the pen 501 and forecasts and predicts factors of interest including expected pen location and feasible range, given the available propulsion unit 502 and energy availability to the propulsion unit 502, using the data available from attached or remote sensors (503, 507), including weather above or below the surface of the water 506, and data otherwise available.

According to an embodiment of the present invention, the sensors 503 include a GPS tracking device determining current location and a current velocity of the aquaculture pen, a conductivity meter measuring salinity, a spectrophotometer measuring nitrogen, and colorimetric or photometric equipment for measuring silicon and/or phosphorous. These sensors 503 provide data to the computer system 504, which uses the data as input to the analytics.

According to an embodiment of the present invention, sensors 503 gather data during movement for future calculations. According to at least one exemplary embodiment, if this data deviates sufficiently from predicted values, then a pen 501 can stop its own movement, and optionally the movement of other nearby pens (e.g., within some range) and initiate a re-calculation of optimal positions based on the gathered data.

According to an embodiment of the present invention, the propulsion unit 502 can be a dedicated, i.e., to the particular pen, unit and attached to the pen in any suitable manner, a remote controlled tender craft servicing one or more pens, a tugboat, and the like. Examples of the propulsion unit 502 are illustrative and are not limiting. According to one or more embodiments of the present invention, the propulsion unit 502 receives commands from the computer system 504 to move or adjust a current speed and/or direction to achieve a determined positioning.

A new location of a pen can be determined using a variety of methods. According to one exemplary embodiment of the present invention, the new location is determined using a genetic method (see FIG. 6, method 600) including generating an initial solution population 601, candidate solutions are evaluated 602, and a stopping criteria is evaluated 603. If the stopping criteria is not satisfied and 603, then one or more of the candidate solutions are selected as parent 604 and a new population is generated with crossover and mutation 605. This new population is then evaluated at 602. Once the stopping criteria is satisfied at 603, then a best solution among the candidate solutions is selected at 606 as the new location of the pen.

Figure 6:
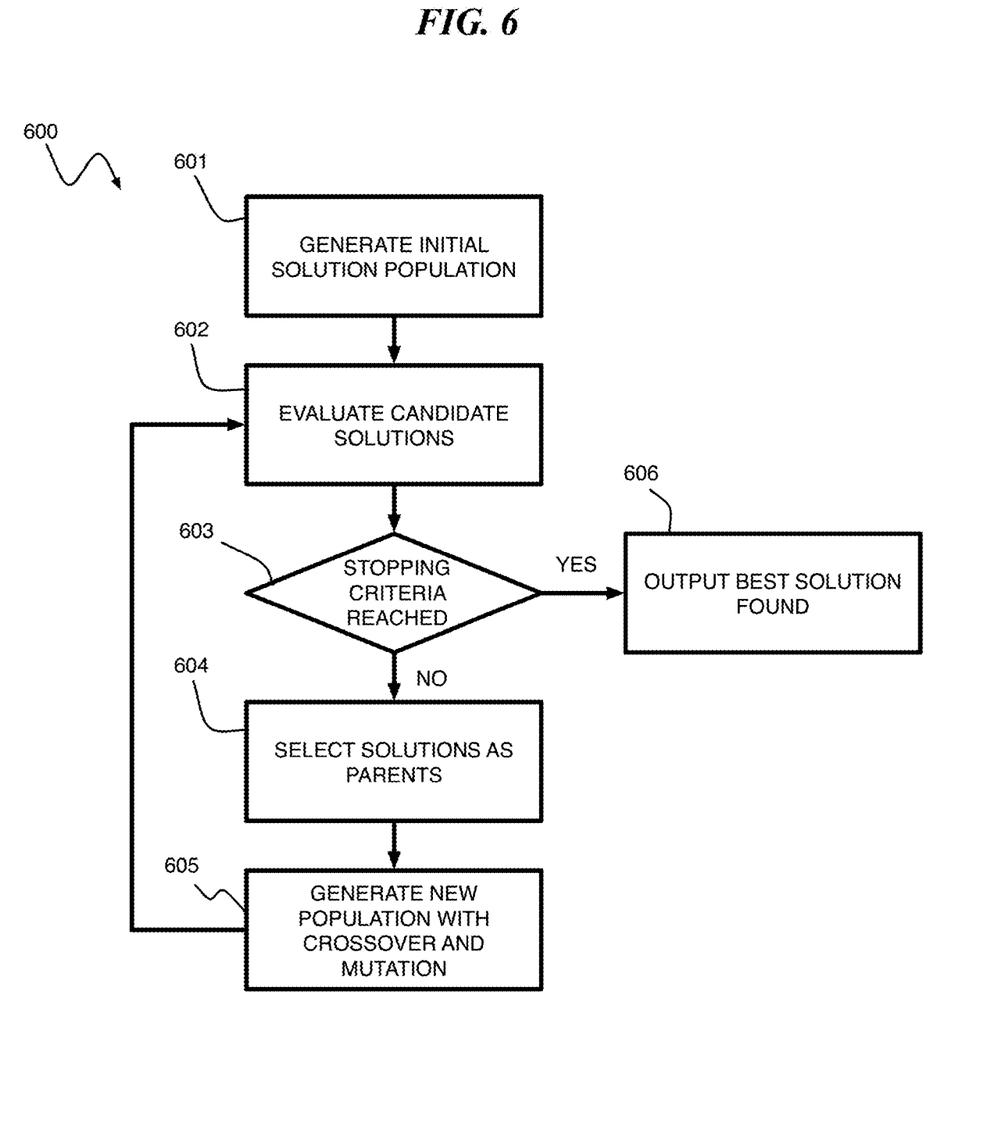
FIG. 6 is a flow diagram of a method of determining a new position for an aquaculture pen according to an embodiment of the present invention.

According to an embodiment of the present invention, the initial solution population is generated 601 as a set of feasible locations around a current location. The set of feasible locations can be determined using parameters including, for example, available fuel, weather conditions, the licensed area for crop production and a sparsity condition enforcing a minimum distance between the feasible locations.

According to an embodiment of the present invention, the evaluation of the candidate solutions 602 includes scoring each of the feasible locations. For example, a feasible location can be scored as a combination of parameters. These parameters can include, for example, a cost of adjusting a location of the pen to the feasible location, an estimated productivity at the feasible location, etc. These and other parameters are contemplated within the scope of the present invention and would be understood by a person of ordinary skill in the art in view of the present disclosure.

According to an embodiment of the present invention, the stopping criteria 603 is a threshold. For example, the stopping criteria can be satisfied when at least one of the feasible solutions has a score greater than a score of the current location. Another exemplary stopping criteria can be satisfied when at least one of the feasible solutions has a score greater than a minimum score for movement the pen to a new location. These and other stopping criteria are contemplated within the scope of the present invention and would be understood by a person of ordinary skill in the art in view of the present disclosure. According to an embodiment of the present invention, the feasible solution selected at 606 has a highest score among those that satisfy the stopping criteria.

According to an embodiment of the present invention, if no stopping criteria is satisfied at 603, then two or more of the feasible solutions are selected at 604. Selected feasible solutions can include a predetermined number of feasible solutions have the highest scores among the set of feasible solutions. According to an embodiment of the present invention, the new population of feasible solutions generated at 605 by combining aspects of the selected feasible solutions. By combining traits from two or more parent feasible solutions (i.e., crossover), child feasible solutions inherit the traits from each of its parents. An element of randomness is introduced (for example, using a random variable) into the combination of the parents' traits or into the child feasible solution itself (i.e., mutation) in generating the new population of feasible solutions.

It should be understood that the genetic method described in connection with FIG. 6 is merely an exemplary selection algorithm, and that other methods of selecting a new location are possible and would be understood by a person of ordinary skill in the art in view of the present disclosure.

Recapitulation:

According to an embodiment of the present invention, a method of positioning an aquaculture pen includes retrieving data about the aquaculture pen disposed in a water environment, determining a forecasted location of the aquaculture pen, forecasting at least one factor of interest based on the data about the aquaculture pen for a time period of interest. predicting a factor of interest within a feasible range of movement for the aquaculture pen, determining a potential new location within the feasible range of movement using the data about the aquaculture pen, the feasible range of movement and the factor of interest within the feasible range of movement for the aquaculture pen, and moving the aquaculture pen to the potential new location.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system 504 for selecting a new location. Further, a computer program product can include a tangible computer-readable recordable storage medium with code adapted to be executed to carry out one or more method steps described herein, including the provision of the system with the distinct software modules.

Figure 7:
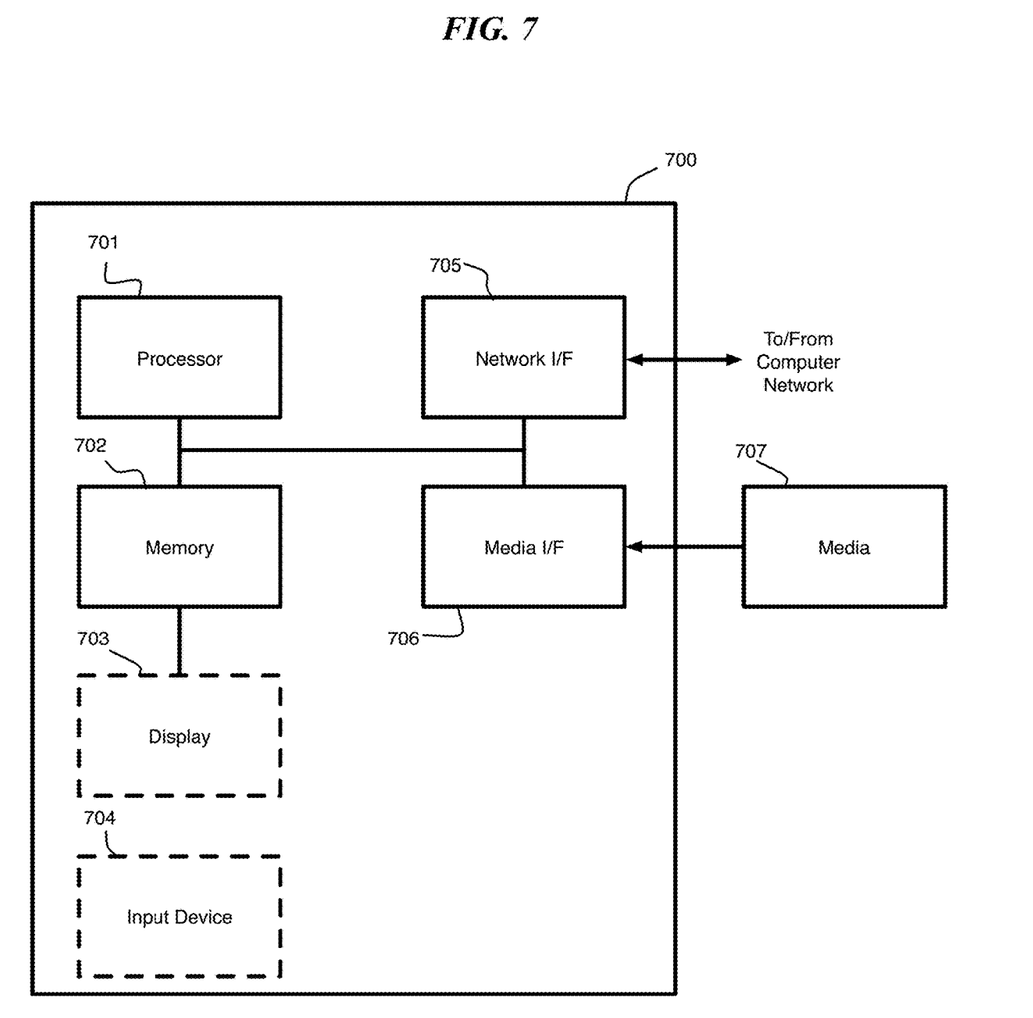
FIG. 7 is a block diagram depicting an exemplary computer system embodying a method for positioning an aquaculture pen according to an exemplary embodiment of the present invention.

Referring to FIG. 7; FIG. 7 is a block diagram depicting an exemplary computer system embodying the computer system for determining pen placement (see for example, computer system 504, FIG. 5) according to an embodiment of the present invention. The computer system shown in FIG. 7 includes a processor 701, memory 702, display 703, input device 704 (e.g., keyboard), a network interface (I/F) 705, a media I/F 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
an aquaculture pen;
a sensor disposed at the aquaculture pen;
a computer system in communication with the sensor, wherein the computer system retrieves, from the sensor, data about the aquaculture pen, determines a forecasted location of the aquaculture pen, forecasts at least one factor of interest based on the data about the aquaculture pen for a time period of interest, predicts a factor of interest within a feasible range of movement for the aquaculture pen, and determines a potential new location within the feasible range of movement using the data about the aquaculture pen, the feasible range of movement and the factor of interest within the feasible range of movement for the aquaculture pen; and
a propulsion unit in communication with the computer system, receiving a control signal from the computer system for positioning the aquaculture pen at the potential new location.

2. The system of claim 1, further comprising a remote sensor in communication with the computer system, the computer system receiving additional data from the remote sensor, wherein the computer system uses the additional data in determining the potential new location.

3. The system of claim 1, further comprising an additional aquaculture pen comprising a respective sensor in communication with the computer system and a respective propulsion unit receiving an additional control signal from the computer system.

* * * * *